United States Patent [19]
Katsuta et al.

[11] Patent Number: 5,127,792
[45] Date of Patent: Jul. 7, 1992

[54] CENTRIFUGAL PUMP HAVING MAGNET BEARING

[75] Inventors: Seigo Katsuta; Yoichi Kanemitsu; Masao Matsumura, all of Kanagawa, Japan

[73] Assignee: Ebara Corporation, Tokyo, Japan

[21] Appl. No.: 676,458

[22] Filed: Mar. 26, 1991

Related U.S. Application Data

[63] Continuation of Ser. No. 396,210, Aug. 21, 1989, abandoned.

[30] Foreign Application Priority Data

Aug. 22, 1988 [JP] Japan .................. 63-206344

[51] Int. Cl.$^5$ ................................ F01D 3/00
[52] U.S. Cl. .................. 415/104; 415/107; 417/424.1
[58] Field of Search .......... 415/104, 107, 106; 417/424.1, 423.12, 423.13, 423.8; 310/90.5

[56] References Cited

U.S. PATENT DOCUMENTS

| | | | |
|---|---|---|---|
| 4,057,369 | 11/1977 | Isenberg et al. | 417/423.13 |
| 4,312,628 | 1/1982 | Yamamura | 417/423.13 |
| 4,683,111 | 7/1987 | Helm et al. | 417/423.13 |

FOREIGN PATENT DOCUMENTS

| | | |
|---|---|---|
| 2295273 | 7/1976 | France . |
| 63-36691 | 3/1988 | Japan . |
| 1213256A | 10/1986 | U.S.S.R. . |
| 2130655A | 6/1984 | United Kingdom . |

OTHER PUBLICATIONS

The Active Magnetic Bearing Enables Optimum Damping of Flexible Rotor, The American Society of Mechanical Engineers, 84-GT-117.
The Application of Active Magnetic Bearings to Natural Gas Pipeline Compressor, The American Society of Mechanical Engineers, 86-GT-61.

Primary Examiner—John T. Kwon
Attorney, Agent, or Firm—Nikaido, Marmelstein, Murray & Oram

[57] ABSTRACT

A cemtrifugal pump in which the thrust generated by an impeller is balanced by the operation of a balancing disc device. In the pump, a magnetic bearing is employed as an axial thrust bearing. The distance between the surface of a balancing disc and an axial displacement detecting surface which, together with the pump shaft, and the distance between such surface of a balancing disc seat is a fixed-side member which faces the balancing disc surface. The surface of a displacement sensor is another fixed-side member which faces the axial displacement detecting surface and are made equal to each other, or the latter distance is made slightly larger than the former distance. The neutral position of the magnetic thrust bearing is made to substantially coincide with the axial position of the rotator of the pump and is determined by the balancing disc device during running of the pump. By these arrangements, the position of the stator is determined by the balancing disc device during normal operation of the pump, whereas the position is determined by the magnetic thrust bearing when the pump is at rest or in a transient running state.

6 Claims, 5 Drawing Sheets

CENTRIFUGAL PUMP HAVING MAGNET BEARING

This application is a continuation of application Ser. No. 396,210 filed Aug. 21, 1989 now abandoned.

BACKGROUND OF THE INVENTION

1. Field of the Invention

The present invention relates to a single or multi-stage centrifugal pump which is designed so that axial thrust is hydraulically balanced by means of a balancing disc device. More particularly, the present invention pertains to a centrifugal pump which uses both the above-described balancing disc device and a magnetic thrust bearing.

2. Prior Art

Balancing disc devices have heretofore for a long time been employed as axial thrust balancing devices in centrifugal pumps. A typical conventional balancing disc device in a centrifugal pump is arranged such that a fixed throttle constituted by an axial gap, and a movable throttle constituted by a radial gap, are disposed in series in a passage for returning a part of the pressurized water from the discharge stage of the pump to a low-pressure section to thereby vary the pressure inside the space between the two throttles in accordance with a change in the flow resistance at the movable throttle caused by a change in the axial position of the pump shaft, thereby automatically balancing the axial thrust in the pump. It has already been confirmed by many years of achievement that the axial thrust balancing function of such conventional balancing devices, if properly designed, is substantially perfect during steady-state running of the pumps, although there are changes and modifications in regard to the details of the structure, that is, regarding the positional relationship between the fixed and movable throttles and as to which one of them is disposed closer to the center of the pump rotating shaft.

FIG. 1 is a fragmentary sectional view of one example of a multi-stage centrifugal pump to which the above-described balancing disc type axial thrust balancing device is applied. A balancing disc 3 is formed so as to be integral with the reverse surface of a main shroud 2a of a final-stage impeller 2 attached to a pump (motor) shaft 1. A balancing disc seat 4 is attached to a motor casing in opposing relation to the balancing disc 3 with a radial gap $\epsilon_2$ provided therebetween. An axial gap $\epsilon_1$ is provided between a liner ring integally formed on the reverse surface of the main shroud and a cylindrical bore formed in the motor casing. Thus, an intermediate chamber 6 is defined between the gaps $\epsilon_1$ and $\epsilon_2$. The rear side (downstream side) of the balancing disc seat 4 is communicated with a motor chamber 8 through a relief passage 7.

During the running of the pump, a part of the fluid discharged from the final-stage impeller 2 flows into the intermediate chamber 6 through the axial fixed gap $\epsilon_1$ that is formed at the reverse side of the main shroud 2a so that the size of the gap $\epsilon_1$ is fixed, thus applying leftward (i.e., toward the suction port) axial thrust to the impeller 2. The leftward axial thrust causes the shaft 1 to move leftward against the rightward thrust acting on a shroud 2b. In consequence, the size of the radial gap $\epsilon_2$ that constitutes a variable throttle, increases, so that the flow resistance at the variable throttle is lowered. However, since the gap $\epsilon_1$, that is present at the upstream side of the intermediate chamber 6, constitutes a fixed throttle where the flow resistance is not changed by the sideward movement of the shaft 1, as the gap $\epsilon_2$ enlarges, the pressure inside the intermediate chamber 6 is lowered. As a result, rightward thrust acts on the impeller 2 as a whole, causing the gap $\epsilon_2$ to be narrowed. As the gap $\epsilon_2$ narrows, the pressure inside the intermediate chamber 6 rises again and the rightward thrust acting on the impeller 2 decreases, resulting in the shaft 1 being moved leftward again.

Thus, the balancing disc device constitutes an automatic control system which determines the size of the gap $\epsilon_2$ by itself in accordance with the level of the axial thrust generated by the impeller. It should be noted that if the positional relationship between the gaps $\epsilon_1$ and $\epsilon_2$ is opposite to the above, the movement of the shaft 1 and the change in the size of the gap $\epsilon_2$ are reversed to the above; however, the operating principle and the effectiveness are the same as the above.

As has been described above, in the conventional axial thrust balancing device, the size of the variable gap $\epsilon_2$ is automatically set at an optimal value during steady-state running and the pump is run smoothly if the radial (annular) area of the intermediate chamber 6 is set so as to be a proper size relative to the annular area defined between the impeller mouth ring 2c, and the shaft 1, and the size of the fixed gap $\epsilon_1$ is set at a proper value in connection with the annular area of the intermediate chamber 6. Accordingly, pumps which are equipped with a balancing disc device do not usually have a thrust bearing for fixing the pump shaft in the axial direction.

However, in the conventional type device, when the pump is in a transient running state, for example, at the time of starting or stopping the pump, there is a time lag between the formation of the differential pressure between the upstream and downstream sides of the impeller that causes axial thrust, and the formation of the differential pressure between the upstream and downstream sides of the balancing disc device that causes a thrust counter to the axial thrust. This is because each differential pressure is formed by a pressure drop in the fluid upon passing through a throttle passage and therefore a certain time is needed for the flow to become steady. For this reason, the impeller thrust and the balancing disc thrust are not in balance with each other in the transient running state, although such an imbalanced state continues only for an extremely short period of time. Therefore, there has heretofore been a fear that the gap $\epsilon_2$ will momentarily become zero, which results in contact between metallic members and, if this is repeated, the metallic members may become worn. Further, in the case of a vertical shaft type pump, there has been a problem that the rotator cannot be fixed to a certain axial position when the pump is suspended, which has been inconvenient.

For the above-described reasons, it is an occasional practice to use a thrust bearing in conjunction with a balancing disc device. In such a case, the value of the gap $\epsilon_2$, during the running of the pump is, estimated by precise calculation and the position of the thrust bearing is set so that the estimated value for the gap $\epsilon_2$ is maintained. Accordingly, a great deal of time and labor is required, and if there is a mistake in these procedures, the load applied to the thrust bearing may be excessive, resulting in the bearing becoming worn prematurely.

SUMMARY OF THE INVENTION

Under these circumstances, it is an object of the present invention to provide a centrifugal pump having an axial thrust balancing device, which is designed so that it is possible to safely cope with a change in the position of the pump shaft, even when the pump is running in a state other than the regular running state, and to prevent the metal contact of the balancing disc surface at the time of starting and stopping the pump, and to enable the rotator to be fixed to a certain position when the pump is at rest, without the need for a time- and labor-consuming operation such as that described above.

To attain the above-described object, the present invention provides a centrifugal pump wherein a magnetic bearing is employed as an axial thrust bearing, the distance between the surface of a balancing disc and an axial displacement detecting surface which moves together with the pump shaft, and the distance between that surface of a balancing disc seat as being a fixed-side member which faces the balancing disc surface, and that surface of a displacement sensor as being another fixed-side member which faces the axial displacement detecting surface, are made equal to each other, or the latter distance is made slightly (0.2 mm at maximum) larger than the former distance, and the neutral position of said magnetic thrust bearing is made to be substantially coincident with the axial position of the rotator of said pump that is determined by said balancing disc device during running of said pump.

In this invention, since the positional relationship between the surface of the balancing disc, the axial displacement detecting surface, the surface of the balancing disc seat and the surface of the displacement sensor is set as described as above, a gap between the surface of the axial displacement sensor and the axial displacement detecting surface is substantially equal to a gap between the surface of the balancing disc and the surface of the balancing disc seat and the former gap represents the latter gap. Therefore, by controlling the neutral position of the magnetic thrust bearing based on the output signal from the displacement sensor, which gives the output signal of the former gap, it is possible to maintain a desired gap between the surface of the balancing disc and the surface of the balancing disc seat.

If the distance between the surface of the balancing disc seat and the surface of the displacement sensor is selected so as to be slightly larger than the distance between the surface of the balancing disc and the axial displacement detecting surface as described above, the former gap is made slightly larger than the latter gap. Thus, in this case, even if the latter gap is made to be zero due to some reason during the operation of the pump, the displacement sensor does not contact the axial displacement detecting surface and, therefore, the destruction of the displacement sensor is prevented.

By virtue of the above-described arrangement, when the pump is at rest and the magnetic bearing is not energized, the rotator (in the case of a vertical shaft type pump) is placed at its lower position by its own weight and supported by a lower touch-down bearing or the like.

Next, as the magnetic bearing is energized, the rotator is levitated by means of the electromagnetic force from the magnetic thrust bearing and stabilized at a position where the gap $\epsilon_3$ between the surface of an axial displacement sensor and an axial displacement detecting surface reaches a predetermined value. If, at this time, the gap $\epsilon_2$ between the surface of the balancing disc and the surface of the balancing disc seat is maintained at a safe value (0.2 mm or more), the rotator is in a state wherein it is completely floating in the axial direction and is not in mechanical contact with any other part. Preferably, such gap is selected so that it corresponds to a gap between the surface of the balancing disc and the surface of the balancing disc seat, which is established during steady-state running of the pump, or a slightly larger gap, in consideration of the safety of the device when the pump is idling.

If, in this state, the pump is started, as the pump generates a pump head, the balancing disc device starts exhibiting its function, so that the gap $\epsilon_2$ at the balancing disc device is automatically converged to a value determined by the pump design on the basis of the operating principle which has already been described above. Thus, during the running of the pump the rotator is operated at a position corresponding to the gap $\epsilon_2$, determined by the hydraulic factors of the pump, irrespective of the position of the neutral point of the magnetic thrust bearing.

If the switch is turned off while the pump is running, the rotational speed of the pump is lowered and the hydraulic levitating force is rapidly lowered in proportion to the square of the number of revolutions of the pump and eventually becomes unable to bear the weight of the rotator (in the case of a vertical shaft type pump). However, in this invention, the rotator is held floating at the same position, or a position slightly (0.1 mm to 0.2 mm) lower than that during the running of the pump by virtue of the action of the magnetic thrust bearing.

BRIEF DESCRIPTION OF THE DRAWINGS

The above and other objects, features and advantages of the present invention will become more apparent from the following description of the preferred embodiment thereof, taken in conjunction with the accompanying drawings, in which like reference numerals denote like elements and, in which.

DETAILED DESCRIPTION OF THE PREFERRED EMBODIMENTS

One preferred embodiment of the present invention will be described below with reference to the accompanying drawings.

Figure 1:
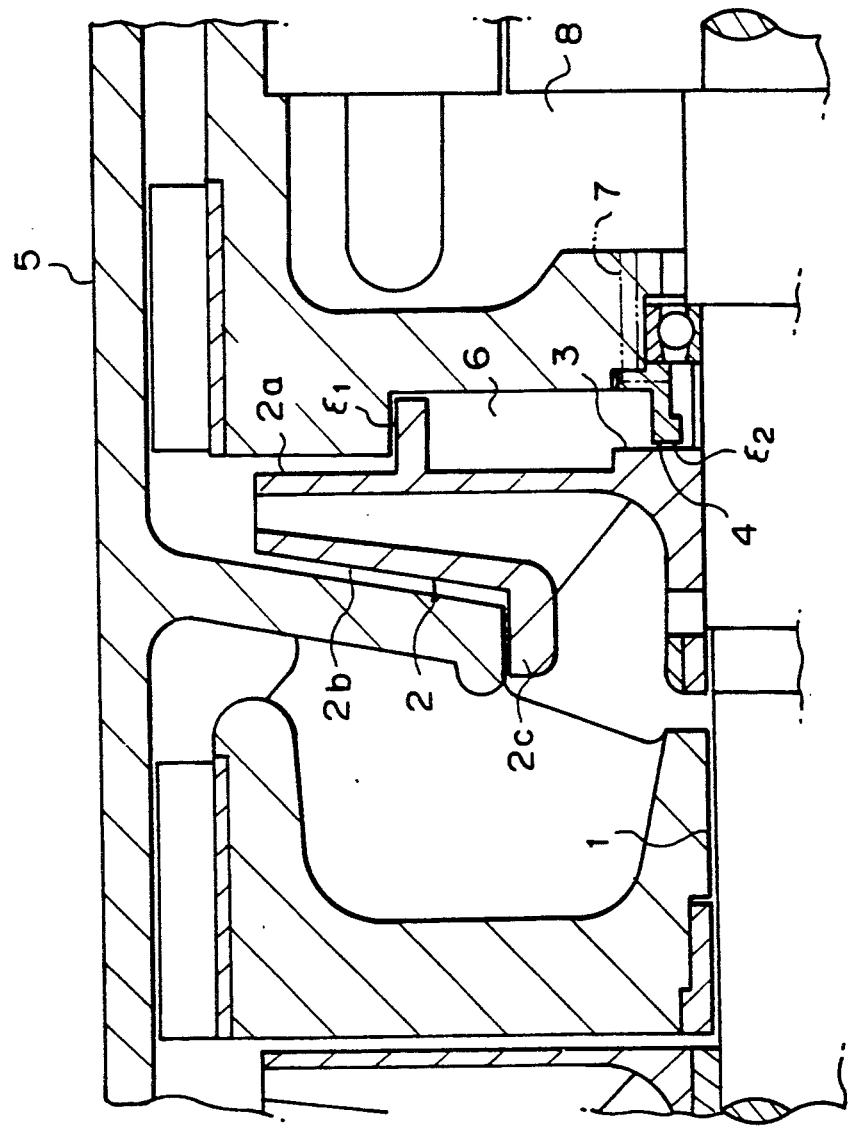
FIG. 1 is a fragmentary sectional view showing a prior art.
Figure 2:
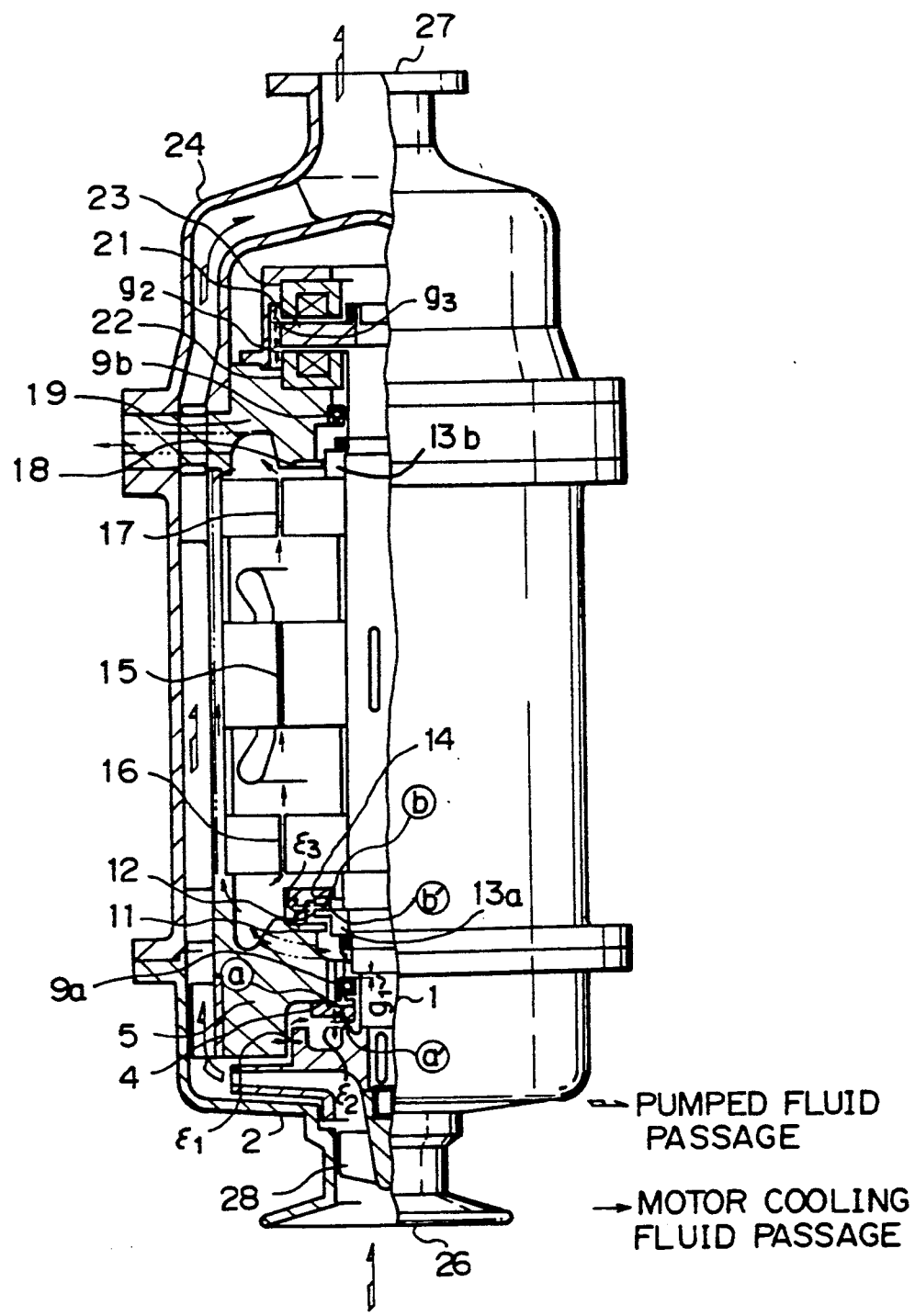
FIG. 2 is a sectional view showing the general arrangement of one embodiment of the present invention in which a magnetic thrust bearing is applied to a submergible motor pump.
Figure 2A:
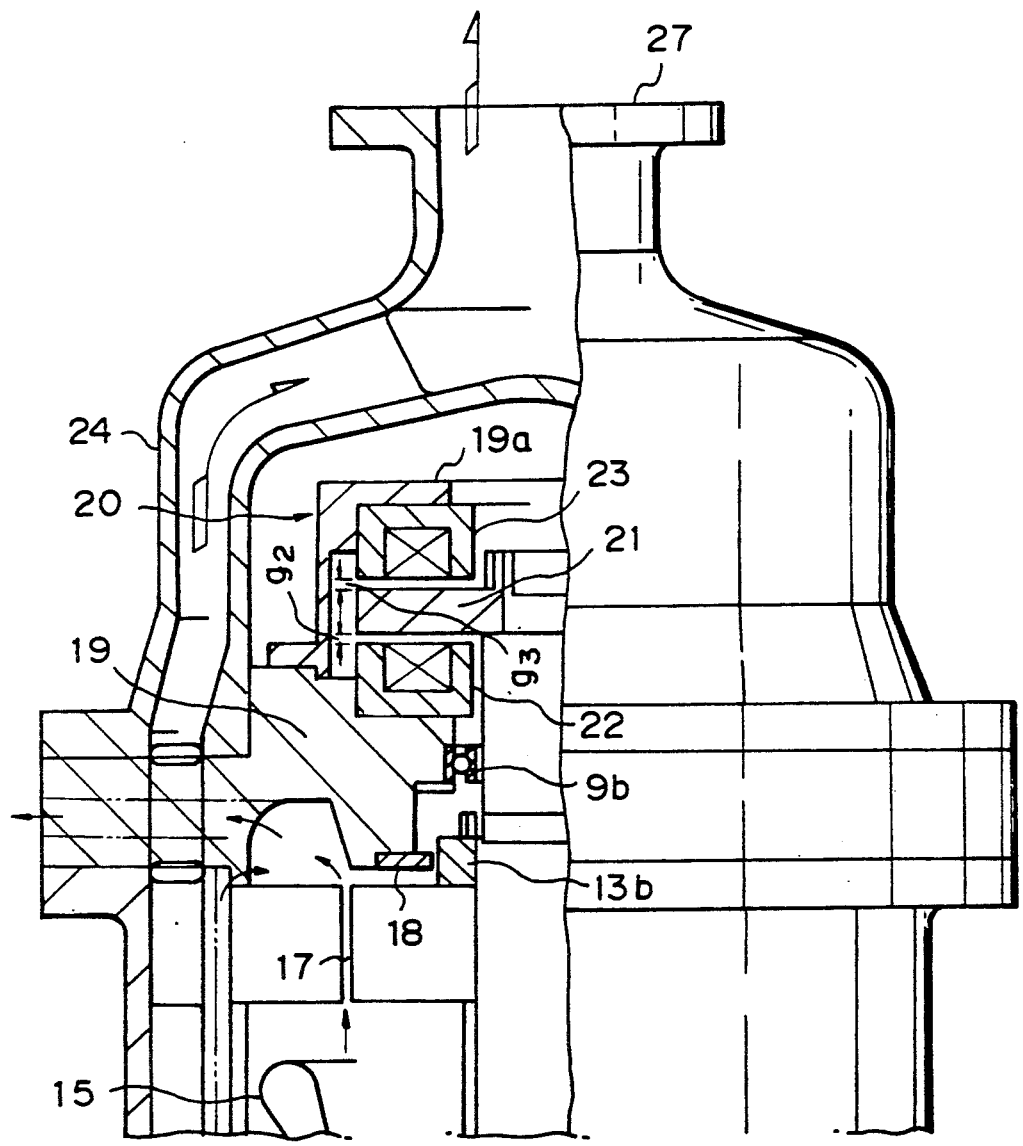
FIGS. 2A and 2B are enlarged sectional views respectively showing the upper and lower halves of the embodiment shown in FIG. 2.
Figure 2B:
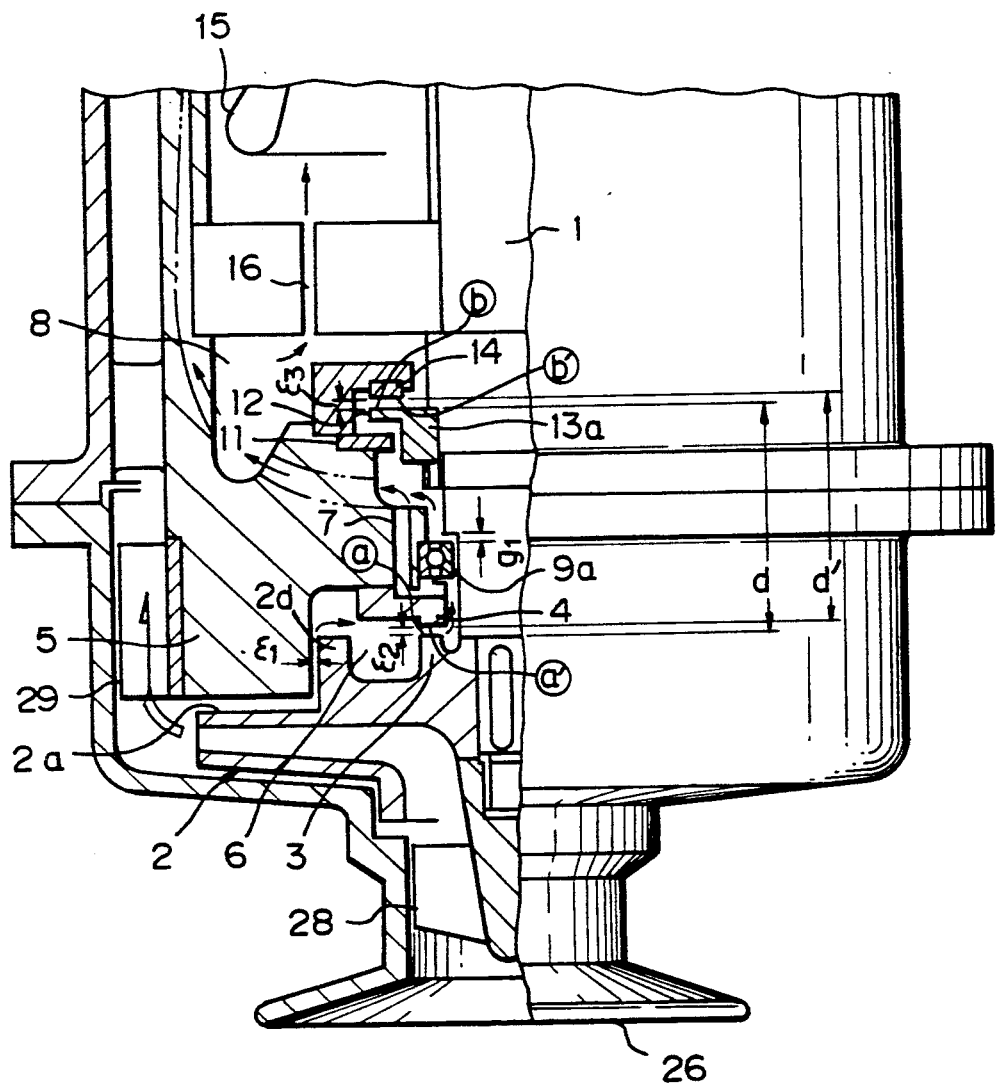

FIG. 2 is a sectional view showing the general structure of one embodiment of the present invention in which a magnetic thrust bearing is applied to a submergible motor pump. FIGS. 2A and 2B are enlarged sectional views respectively showing the upper and lower halves of the embodiment shown in FIG. 2. In these figures, the same reference numerals as those shown in FIG. 1 denote the same or like members or portions.

Referring to the figures, a fixed throttle having an axial fixed gap $\epsilon_1$ is defined between the outer peripheral surface of a liner ring 2d formed integral with the reverse surface of a main shroud 2a of a single-stage impeller 2 and the inner peripheral surface of a casing 5. An intermediate chamber 6 is defined between the liner ring 2d and a balancing disc 3 which is formed integral with the boss of the main shroud 2a. A balancing disc seat 4 is attached to the casing 5 in one unit with a radial gap $\epsilon_2$ provided between the same and the balancing disc 3, thus defining a variable throttle by the balancing disc 3 and the balancing disc seat 4. The inner peripheral side of the balancing disc seat 4 is communicated with the motor chamber through the ball spacing area in a ball bearing, or through a relief passage 7. The above-described arrangement is the same as that of the prior art (shown in FIG. 1).

In this embodiment, a lower radial displacement sensor 11 is attached to the casing 5 on the reverse side (upper side as viewed in the figures) of the balancing disc seat 4 attached thereto. A first radial displacement detecting disc 13a which has an axial displacement detecting disc 12 is fitted on the shaft 1 at the radially inner (inner peripheral) side of the radial displacement sensor 11, and an axial displacement sensor 14 is attached to the casing 5 with an axial gap $\epsilon_3$ provided between the same and the displacement detecting disc 12.

Above the axial displacement sensor 14, a lower magnetic radial bearing 16 and an upper magnetic radial bearing 17 are attached to the shaft 1 spanning an electric motor 15. Above the upper magnetic radial bearing 17, an upper radial displacement sensor 18 is secured to a lower bearing casing 19 in such a manner that the sensor 18 faces the peripheral surface of an annular radial displacement detecting disc 13b which is fitted on the shaft 1.

The current to these magnetic radial bearings 16 and 17 is controlled based on the output signal from the radial displacement sensors 11 and 18 so that the radial spaces of these bearings are maintained constant.

On the other hand, a magnetic thrust bearing 20 that employs electromagnets is attached to the upper end portion of the shaft 1. As the magnetic thrust bearing 20, an active type magnetic bearing which provides a relatively great levitating force is used because of the need to bear the weight of the rotator (e.g., several hundreds of kilograms in the case of a large-sized pump). The magnetic thrust bearing 20 comprises a magnetic thrust bearing disc (rotor) 21 attached to the shaft 1 and a pair of magnetic thrust bearing coils (exciting coils) 23 and 22, each surrounded with a stator yoke, which are disposed so as to face each other across the magnetic thrust bearing disc 21, with vertical gaps $g_3$ and $g_2$ provided between the disc 21 and the coils 23, 22, respectively. The magnetic thrust bearing disc 21 and the magnetic thrust bearing coils 22 and 23 are accommodated in an upper bearing casing 19a. The coils 22 and 23 are adapted to generate an electromagnetic thrust which causes a levitating force in the bearing disc and are rigidly secured to the lower bearing casing 19 or a motor cover 24 so as to bear the counterforce to the electromagnetic force generated.

The current flowing through each of the coils 22 and 23 is controlled so that the gap $\epsilon_3$ is maintained at a predetermined value through a negative feedback circuit which is supplied with an output signal from the axial displacement sensor 14. The load-displacement characteristics of the bearing can be made substantially linear in the vicinity of the neutral point. In the figures, the reference numerals 9a and 9b denote upper and lower touch-down bearings, respectively, 26 a suction port, 27 a discharge port, 28 an inducer, and 29 a guide vane. Among the illustrated two different kinds of arrow, the relatively large arrows with tail feathers that pass through the suction and discharge ports 26 and 27 show a pumped fluid passage, while the relatively small arrows that pass through the motor chamber show a passage of balancing leakage fluid (or motor cooling fluid).

The operation of the pump that employs the above-described magnetic thrust bearing will next be explained.

When the pump is at rest and the magnetic bearing 20 is not energized, the rotator is placed at its lower position by its own weight and the abutting shoulder portion of the shaft 1 is placed on the lower touch-down bearing 9a and supported in the condition that the gap $g_1 = 0$.

Next, as the magnetic bearing 20 is energized, the rotator is levitated by means of the electromagnetic force from the magnetic bearing coil 23 and stabilized at a position where the gap $\epsilon_3$ between the surface b' of the axial displacement sensor 14, and the surface b of the displacement detecting disc 12, reaches a predetermined value. If, at this time, the gap $\epsilon_2$ between the surface a of the balancing disc 3, and the surface a' of the balancing disc seat 4 that faces the surface a, is maintained at a safe value, that is, 0.2 mm or more, the rotator is in a state wherein it is completely floating in the axial direction and is not in mechanical contact with any other part.

If, in this state, the pump is started, as the pump generates a pump head, the balancing disc 3 starts exhibiting its function, so that the gap $\epsilon_2$ at the balancing disc 3 is automatically converged to a value determined by the pump design, on the basis of the operating principle which has already been described above. Since this balancing force is a hydraulic force, the magnitude thereof is incomparably greater than the weight of the rotator, or the magnitude of the restoring force of the magnetic thrust bearing. Therefore, as the pump is started, the rotator is operated at a position corresponding to the gap $\epsilon_2$ determined by the hydraulic factors of the pump by virtue of the above-described mechanism irrespective of the position of the neutral point of the magnetic thrust bearing.

Although the gap $\epsilon_2$ can be estimated by calculation, a more precise value can be obtained by actual measurement carried out during the running of the pump by means of the sensor. There are variations of about ±30% in the value of $\epsilon_2$ due to differences in the pump operating point even for the same number of revolutions. Therefore, by previously setting the neutral point of the magnetic thrust bearing near a position where the gap $\epsilon_2$ at the balancing disc 3 corresponds to a predetermined value established during steady-state running of the pump (in actual practice, however, it may be safer, if the idling of the pump is taken into consideration, to set the neutral point of the magnetic thrust bearing so that the rotator is supported with a gap which is 0.1 mm to 0.2 mm larger than $\epsilon_2$ of above), it is possible to make the magnetic bearing free from any excessive load during the rotation of the rotator. This means that when the pump is running normally, no magnetic thrust bearing is needed since the pump rotator is levitated by the hydraulic force generated by itself.

Accordingly, if normal running alone is taken into consideration, it may be unnecessary to energize the magnetic thrust bearing during running of the pump. However, when the pump head is considerably lowered due to serious cavitation or suction of gas, the balancing disc device cannot operate normally; therefore, it is safer to keep the magnetic thrust bearing operative at all times even if the pump trip is effected by means of a motor protecting circuit. The fact that the pump is run in a state wherein the magnetic thrust bearing is offset from the neutral point thereof means that a current that generates a restoring force constantly flows through the feedback circuit. This will, however, give rise to no particular problem if the circuit is properly arranged.

If the switch is turned off while the pump is running, the rotational speed of the pump is lowered and the hydraulic levitating force is rapidly lowered in proportion to the square of the number of revolutions of the pump, and eventually becomes unable to bear the weight of the rotator. However, the rotator is held floating at the same position or a position slightly (0.1 mm to 0.2 mm) lower than that during the running of the pump by virtue of the action of the magnetic thrust bearing.

Figure 3:
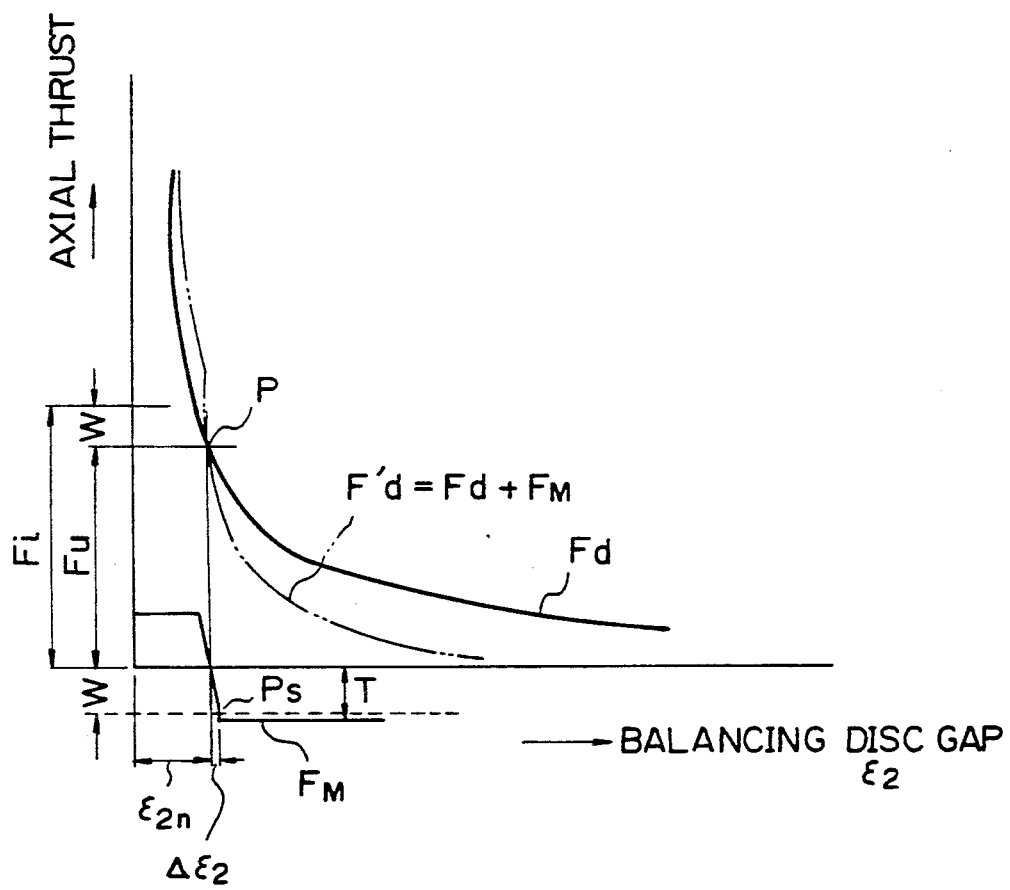
FIG. 3 is a graph showing the operating characteristics of the embodiment.

FIG. 3 is a graph illustrating the relationship between the axial thrust $F_a$ acting on the pump shaft and the gap $\epsilon_2$ at the balancing disc 3, in which the axis of ordinates represents the axial thrust $F_a$, while the axis of abscissas represents the gap $\epsilon_2$.

In the graph, the axial thrust $F_d$ (downward) generated by the balancing disc device 3 is shown by the $F_d$ curve. Assuming that the axial thrust (upward) generated by the impeller 2 is $F_i$ and the weight of the rotator is W, the apparent upward axial thrust $F_u$ is expressed by $F_u = F_i - W$. Therefore, the rotator is operated at the equilibrium point P between thrusts $F_d$ and $F_u$ and the gap at that time is $\epsilon_{2n}$.

On the other hand, the thrust-displacement characteristics of the magnetic thrust bearing are shown by the curve $F_M$. The curve $F_M$ is inverted at the neutral point so that, when the gap $\epsilon_2$ is smaller than $\epsilon_{2n}$ (neutral point), downward thrust is applied by the lower coil 22, whereas, when the former is greater than the latter, upward thrust is applied by the upper coil 23. The reference symbol T denotes the capacity of the magnetic thrust bearing which is designed to be of a value corresponding to the weight W plus an allowance. More specifically, the curve $F_M$ may be considered to be a thrust curve (the downward direction is taken as the positive direction; therefore, the negative portion represents the upward thrust and it is possible to balance the weight) at a time when the pump is at rest. Thus, the weight W (which is a downward thrust) is borne in a state wherein the gap at the balancing disc is $\Delta\epsilon_2$ greater than that at the neutral point. The downward axial thrust during the running of the pump that employs both a balancing disc device and a magnetic thrust bearing is the sum of $F_d$ and $F_M$ and expressed by the curve $F'_d$ shown in the figure. If the neutral point of the magnetic bearing and the point P are coincident with each other, the balancing disc gap $\epsilon_2$ is the same as the value $\epsilon_{2n}$ in the case where no magnetic thrust bearing is employed. If these two points are not coincident with each other, the curve $F'_d$ is distorted and $\epsilon_{2n}$ slightly changes. However, such a change in the value $\epsilon_{2n}$ will give rise to no problem in the operation of the pump. In the process of stopping the pump, the curve $F_d$ moves downward as the rotational speed decreases. However, since the axial thrust $F_i$ generated by the impeller also decreases simultaneously, the abscissa of the intersection P shifts with substantially no change, and when the ordinate of the intersection P, that is, $F_u$, eventually reaches 0, the gap $\epsilon_2$ is lowered down to a point, that is, a point where mechanical support is available. In such a case, in the prior art, the rotator has heretofore been supported by a thrust pad or a submerged bearing, for example, a ball bearing. In the present invention, however, the curve $F_d$ is transformed to the curve $F'_d$ by virtue of the magnetic thrust bearing additionally employed. Although the curve $F'_d$ also moves downward as the rotational speed is lowered, since the ultimate figure of the curve in the case where the pump is stopped is that shown by $F_M$, the vertical thrust still has the intersection $P_s$ and the rotator is supported in a floating state.

In the foregoing, the description has been made with respect to an ideal case where the neutral point of the magnetic thrust bearing is made coincident with the shaft position in which the gap $\epsilon_{2n}$ is formed. However, even when the neutral point is slightly offset, i.e., on the order of a fraction of 1 mm, there will only be slight changes in the curve $F'_d$ and the value $\epsilon_{2n}$ and therefore no problem will arise as a whole.

It should be noted that in many cases, the ratio of the weight W to the impeller thrust $F_i$, and the ratio of the thrust T generated by the magnetic thrust bearing to the axial thrust $F_d$ generated by the balancing disc, are values which are much smaller than those which may be imagined from the graph shown in FIG. 3. Therefore, there is only a slight difference between the curve $F_d$ and the curve $F'_d$. FIG. 3 is drawn exaggeratedly in order to facilitate understanding of the principle.

As has been described above, the gap $\epsilon_2$ at the balancing disc 3 is maintained at a constant value for a constant delivery flow rate during running of the pump. However, if the distance d between the surface a of the balancing disc 3 and the surface b of the displacement detecting ring 12 that faces the axial displacement sensor 14 and the distance d' between the surface a' of the balancing disc seat 4 that faces the surface a and the surface b' of the axial displacement sensor 14 that faces the surface b are made equal to each other or the latter d' is made greater than the former d to the maximum limit within 0.2 mm, and if the axial position of the rotator of the pump that is determined by the balancing disc device during the running of the pump is made to be substantially coincident with the neutral position of the magnetic thrust bearing 20, the magnetic thrust bearing 20 is held substantially at the neutral position in any operating state of the pump, and even when the pump comes to rest, the rotator is supported while floating at a position similar to the position where it is floating when rotating (it should be noted that when the pump is at rest, it is easy to support the rotator in such a position since it is only necessary to bear the weight of the rotator). Accordingly, the pump can be started and stopped without any danger that the rotator will come into mechanical contact with a portion of the fixed side and it is therefore possible to use the pump over a long period of time without the need for maintenance.

Although in the foregoing embodiment the present invention has been described by way of an example in which it is applied to a submergible motor pump, the above-described principle applies to any pump wherein the axial thrust is balanced by the action of a balancing disc device and, therefore, the present invention may similarly be applied to any pump of said type. In addition, although in the foregoing the present invention has been described with respect to a vertical shaft type pump, the present invention may also be appied to horizontal shaft type pumps, as a matter of course.

As has been described above, according to the present invention, since a pump is constructed as described in the main claim, when the pump is in such an operative state that the balancing disc device functions normally, the position of the rotator is determined by the balancing disc device, whereas, when the balancing disc device does not function normally at the time, for example, when the pump is at rest, the position of the rotator is determined by the magnetic thrust bearing. Thus, in the case of a vertical shaft type pump, the rotator is held floating at said position, determined by the magnetic thrust bearing, while its own weight is being supported, whereas, in the case of a horizontal shaft type pump, the rotator is held near the neutral position in correspondence with the axial thrust that is generated due to the time lag between the generation of the impeller axial thrust and the generation of the balancing disc axial thrust. There is therefore no fear of the rotator coming into contact with a portion of the fixed side in any state of the pump. Thus, it is possible to realize a maintenance-free pump.

Although the present invention has been described through specific terms, it should be noted here that the described embodiment is not necessarily exclusive and various changes and modifications may be imparted thereto without departing from the scope of the invention which is limited solely by the appended claims.

What is claimed is:

1. A centrifugal hydraulic pump having a casing, a pump shaft rotatable in said casing, an impeller fixed to said pump shaft and rotatable in said casing therewith, said impeller having a fluid inlet opening adjacent said pump shaft and a fluid outlet opening at the radial outer edge of said impeller, a balancing disc device for balancing axial thrust generated by said impeller while said impeller and said shaft rotate in said casing, said balancing disc device including a chamber in said casing behind said impeller, said chamber having an inlet opening adjacent said fluid outlet at said radial outer edge of said impeller for receiving fluid pumped by said impeller from said impeller outlet and a fluid discharge opening adjacent a radial inner end of said chamber, a balancing disc on said impeller on the chamber side of said impeller and rotatable in said chamber, a fixed axial throttle opening between said balancing disc and an adjacent wall of said chamber in said inlet opening to said chamber and a variable radial outlet opening between said balancing disc and an adjacent wall of said chamber at said fluid discharge opening, the pressure of fluid between said inlet and outlet openings in said chamber on said balancing disc balancing said axial thrust generated by said impeller during steady state running of said pump, a pair of spaced magnetic support bearings supporting said pump shaft for rotation in said casing and a magnetic thrust bearing for balancing axial thrust generated by said impeller during starting and stopping of said pump, said magnetic thrust bearing including a balancing disc fixed to said shaft and rotatable therewith, electromagnetic coil means fixed to said casing and spaced from opposite axial sides of said balancing disc for balancing axial thrust generated by said impeller during said starting and stopping of said pump, a displacement detecting ring comprising a first axial displacement detecting disc and a first radial displacement detecting disc in a unitary ring fixed to said shaft a first radial displacement sensor fixedly mounted on said casing in radial alignment with said first radial displacement detecting disc and outtputing a signal to one of said pair of spaced magnetic support bearings for maintaining the radial spacing between said one of said pair of spaced magnetic support bearings and said pump shaft constant, a second radial displacement detecting disc fixed to said pump shaft, a second radial displacement sensor fixedly mounted on said casing in radial alignment with said second radial displacement detecting disc and outputting a signal to the other of said pair of spaced magnetic support bearings for maintaining the radial spacing between said other of said pair of spaced magnetic support bearings and said pump shaft constant and an axial displacement sensor fixed to said casing and axially spaced from said axial displacement detecting disc and means for receiving an output signal from said axial displacement sensor and controlling said electromagnetic coil means for establishing and maintaining said axial space between said axial displacement sensor and said axial displacement detecting disc at a preset spacing during said starting and stopping of said pump.

2. The centrifugal pump of claim 1, wherein said magnetic bearing comprises a magnetic thrust bearing disc attached to said pump shaft and a pair of magnetic thrust bearing coils secured to a fixed portion of said pump, said coils being disposed so as to face each other across said magnetic thrust disc with gaps provided between said disc and each of said coils.

3. The centrifugal pump of claim 2, wherein said gap between said axial displacement detecting surface and surface of said displacement sensor represents a gap between said surface of said balancing disc and said surface of said balancing disc seat, a current flowing through each of said coils is controlled through a negative feedback circuit based on a signal from said axial displacement sensor, whereby said gap between said surface of said balancing disc and said surface of said balancing disc seat is maintained to a predetermined value.

4. The centrifugal pump of claim 3, wherein said gap between said surface of said balancing disc and said surface of said balancing disc seat is made substantially equal to or slightly larger than the same one formed during the running of said pump.

5. The centrifugal pump of any one of claims 2-4 or 1, wherein said pump is a vertical shaft type pump.

6. The centrifugal pump of any one of claim 2 to 4 or 1, wherein said pump is a horizontal shaft type pump.

* * * * *